United States Patent [19]

Wong

[11] 4,347,923
[45] Sep. 7, 1982

[54] GRAVITY CHUTING CONVEYOR

[75] Inventor: Lungchuck Wong, Warren, Mich.

[73] Assignee: F. Jos. Lamb Company, Warren, Mich.

[21] Appl. No.: 213,567

[22] Filed: Dec. 5, 1980

[51] Int. Cl.³ .............................................. B65G 11/00
[52] U.S. Cl. .............................. 193/35 S; 193/25 FT
[58] Field of Search ............. 193/25 R, 25 PT, 35 R, 193/1, 38, 2 R, 25 A, 25 E, 35 S, 37; 104/134, 135

[56] References Cited

U.S. PATENT DOCUMENTS

| | | | |
|---|---|---|---|
| 2,815,841 | 12/1957 | Dabich | 193/25 FT |
| 2,948,375 | 8/1960 | Dabich | 193/25 FT X |
| 3,370,683 | 2/1968 | Mayer | 193/25 R |
| 3,967,712 | 7/1976 | Waitkins et al. | 193/25 FT X |

Primary Examiner—Robert B. Reeves
Assistant Examiner—Gene A. Church
Attorney, Agent, or Firm—Barnes, Kisselle, Raisch & Choate

[57] ABSTRACT

A gravity chuting system having track sections in the form of thin, upright, spring tempered steel rails on which a plurality of rollers are mounted to provide a supporting and conveying surface for workpieces. Similar spring tempered retaining rails on the track sections extend downwardly toward the workpiece supporting rollers and are adjustable vertically relative to the rollers by means of vertically elongated slots.

13 Claims, 7 Drawing Figures

U.S. Patent  Sep. 7, 1982  Sheet 1 of 2  4,347,923
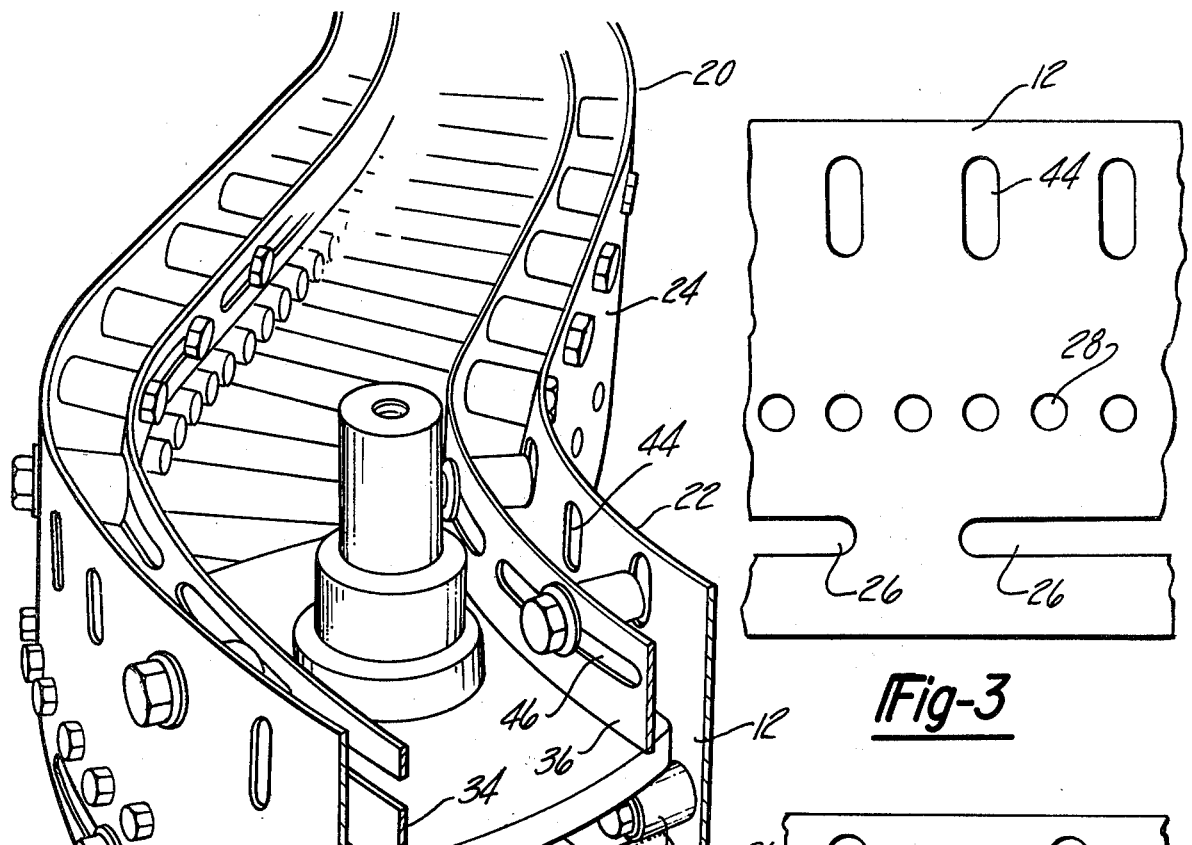
Fig-3
Fig-4
Fig-1
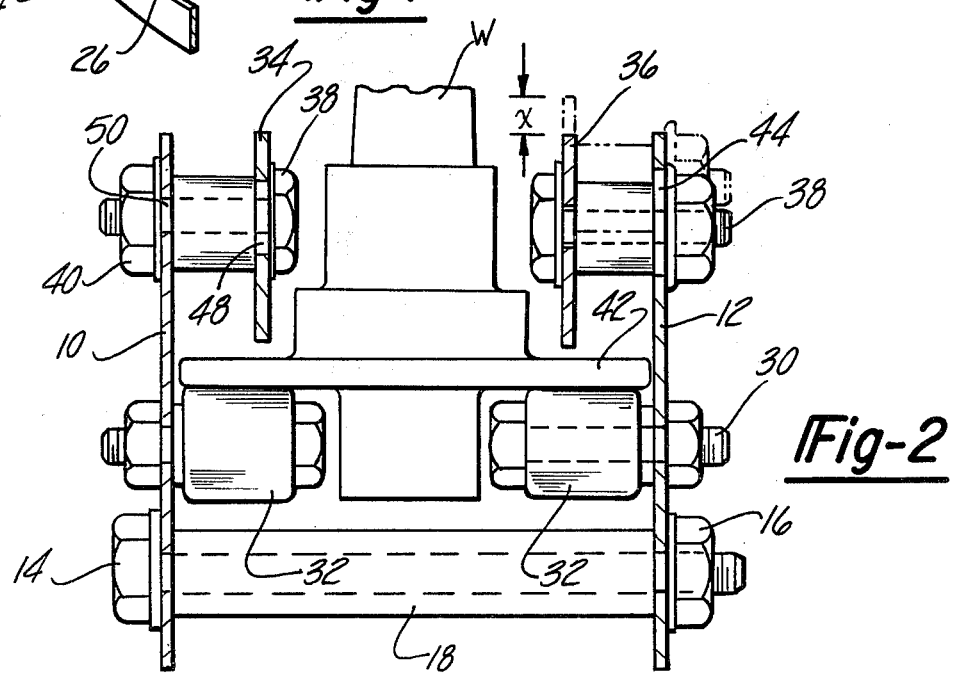
Fig-2

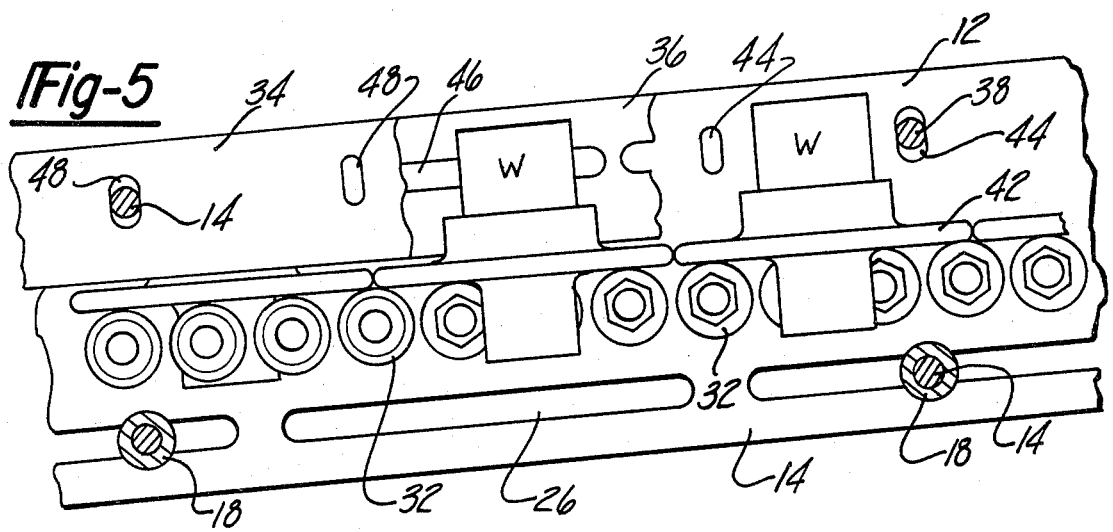
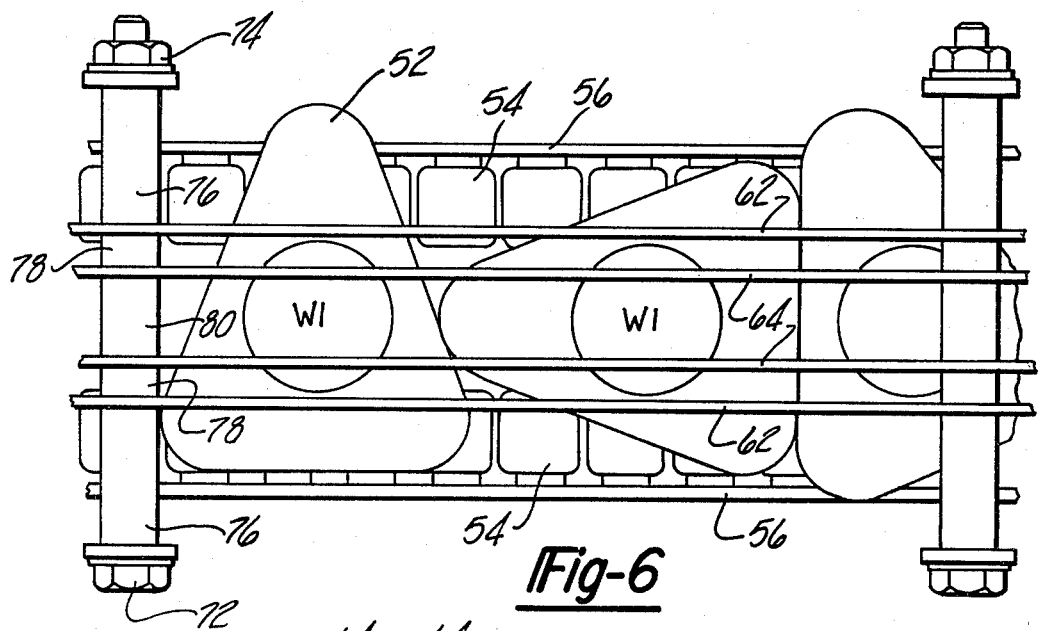
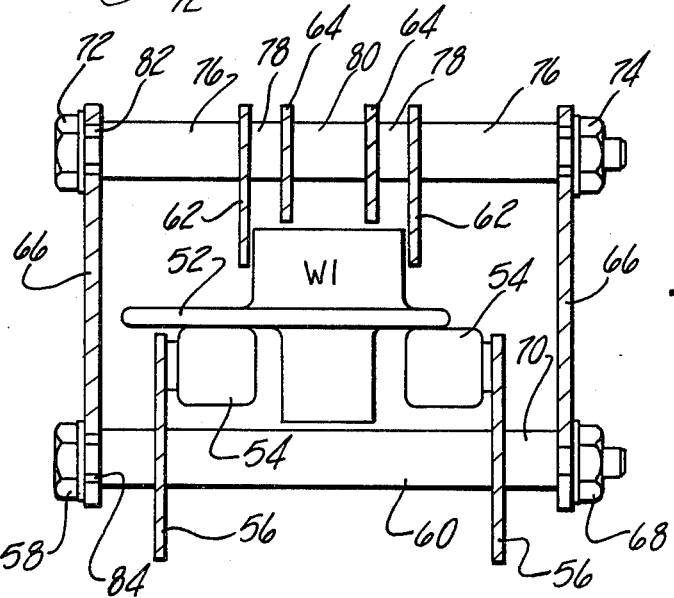

GRAVITY CHUTING CONVEYOR

This invention relates to gravity chuting conveyors and, particularly, to a conveyor wherein the chuting is made essentially of thin, spring tempered rails.

Conveyor chuting of the type to which the present invention relates is shown in U.S. Pat. Nos. 2,815,841 and 2,948,375. This type of chuting has been used extensively and with a great deal of success for many years for conveying relatively small workpieces. Recently there has been a trend toward using chuting of this type for conveying relatively large workpieces because of the economy realized in the manufacture and installation of such chuting in comparison to other types of gravity chuting.

When used for large workpieces not designed to roll, the support surface of the chuting consists of rollers of the type shown in U.S. Pat. No. 2,948,375 rather than slide rails as shown in U.S. Pat. No. 2,815,841. However, recent use of such chuting for conveying large workpieces, especially when the workpieces are wide and relatively thin, has brought to light problems not encountered in the past with small workpieces.

When workpieces are supported on rollers in chuting of this type and the thin edges of successive workpieces are in butting relation, a retaining rail is arranged over the top of the workpieces to prevent the the thin edge of one workpiece from riding up over the preceeding workpiece, a problem commonly known as "shingling". Shingling is relatively easy to prevent when the run of chuting is straight and the support surface for the workpiece is a flat plane provided by two laterally spaced rows of rollers. However, chuting systems of this type invariably include downwardly curved sections for negotiating a corner or establishing a helix. In such downwardly curved sections the workpiece supporting platform is no longer a flat plane, but rather a helical surface generated by two different helix angles, one for each of the two rows of rollers. These two different helix angles result from the differences in the radius of curvature of the curves formed by the two rows of rollers. The helix angle generated by the radially inner row of rollers is always greater than the helix angle generated by the radially outer row of rollers in the curve. These two helix angles can vary greatly depending upon the width and pitch of the chuting and the radius of the bend curvature. The maximum clearance between the retaining rail and the top of the workpieces must be slightly less than that which would permit shingling of the workpieces at any section of the chuting. As long as the workpieces are relatively small this clearance can be substantially uniform throughout the system. This, in the past such retaining rails have been in the form of thin, spring tempered steel strips having a succession of round or horizontally elongated openings therein, such as shown in U.S. Pat. No. 4,027,759, for accommodating the mounting bolts for the retaining rail.

However, when chuting is designed for conveyworkpieces which have thin flat sections that are relatively wide, it has been found that the necessary clearance between the retaining rail and the top of the workpiece has to be greater at a downwardly curved section that at a flat section of the chuting and that this clearance for a small radius curve usually has to be greater than the clearance necessary for a larger radius curve. If the clearance is uniform throughout the system, as in the past, and determined by the necessary clearance at a sharp bend, then the clearance between the retaining rail and the top of the workpiece in straight sections and a larger radius sections will, in all probability, be too large to prevent shingling of the workpieces. If this clearance is uniform and based upon the maximum permissable clearance at straight sections of the chuting track, then the workpieces will bind between the support rollers and the retaining rail at the downwardly curved sections of the track. The present invention resides in the recognition of this problem and the provision of a relatively simple solution to the problem.

The primary object of this invention resides in the provision of a gravity chuting arrangement designed to permit adjustment of the clearance between the retaining rails and the workpiece at various sections of the system in a simple manner so that this clearance can be varied as desired along different sections of the chuting track.

A more specific object of the invention is to provide a chuting arrangement of the roller type wherein one or more rails are provided with regularly spaced openings that are elongated iin a direction transversely of the rail to permit varying the vertical distance between the work supporting rollers and the retaining rail at different sections of the chuting.

Other objects, features and advantages of the present invention will become apparent from the following description and accompanying drawings, in which:

FIG. 1 is a fragmentary perspective view of a portion of a roller gravity chuting arrangement according to the present invention;

FIG. 2 is a transverse vertical sectional view of the chuting illustrated in FIG. 1 and also showing a modification thereof;

FIG. 3 is a fragmentary side elevational view of one of the side rails illustrated in FIG. 1;

FIG. 4 is a fragmentary side elevational view of a modified form of retainer rail shown in FIG. 2;

FIG. 5 is a longitudinal vertical sectional view of the straight portion of the roller chuting shown in FIG. 2;

FIG. 6 is a plan view of a further embodiment of chuting according to the present invention; and FIG. 7 is a transverse vertical sectional view of the chuting shown in FIG. 6.

The chuting arrangement shown in FIGS. 1 and 2 includes a pair of laterally spaced side rails 10,12 which are connected together in laterally spaced relation by screws 14 and nuts 16. The two side rails are uniformly spaced throughout the length of the chute by means of spacers 18 on bolts 14 which extend between the rails. The portion of the chuting shown in FIG. 1 is inclined downwardly and includes three sections; namely, two curved sections 20,22 connected by a straight section 24. In the arrangement illustrated in FIG. 1 it can be assumed that the section 22 inclines downwardly around a curve that has a shorter radius than the curve around which the section 20 extends. The chuting can be formed to this curved configuration because of the nature of the two side rails 10, 12 and the manner in which they are held together.

The rails are preferably made of a high carbon steel that has been heat treated to have the characteristics of a spring. This material is known in the steel industry as "blue tempered spring steel". The temper of the steel renders it relatively hard and difficult to machine with conventional cutters, but it can be readily pierced and sheared with common sheet metal tools. This preferred material is selected first for its ability to be hand formed into smooth curves and, secondly, for its unique wearing and scuff resistant properties. It also has the advantage of being shop prepared with holes and slots and then coiled for shipment to the construction site where the chuting is assembled and erected. This is feasible because side rails 10,12 have longitudinally aligned slots 26 adjacent their lower edges which are pierced to accommodate the bolts 14. The slots are arranged so that the distance between the adjacent ends of each pair of slots is substantially less than the length of the slots. Thus, although the slots in the two rails 10,12 may be transversely misaligned, the securing bolts 14 may be inserted through the overlapping portions of the slots in the two rails. It will be appreciated, of course, that both side rails do not have to have the elongated slots. These slots may be formed in only one of the rails and the other rail is simply provided with a series of round holes to receive the bolts 14. With rails of this type it is apparent that they can be loosely assembled with the bolts 14, screws 16 and spacers 18 and manually flexed to follow any desired tortuous path to a desired destination and then the nuts 16 are tightened to form a rigid permanent and relatively inflexible chuting structure.

Side rails 10,12 are also formed with a longitudinal row of uniformly spaced openings 28 slightly above the slots 26 for accommodating screws 30 on which the workpiece supporting rollers 32 are journalled. The retaining rails 34,36 are also mounted on side rails 10, 12 a predererimined distance above rollers 32 by bolts 38 and nuts 40.

In the arrangement shown in FIGS. 1 and 2 the workpiece W has a mounting flange in the form of a relatively large flat thin plate 42 which is adapted to ride on rollers 32. In a straight section of the chuting such as shown at 24 the clearance between the lower edges of retaining rails 34,36 and the top face of flange 42 is uniform throughout the length of this straight section and can be easily determined. The desirable clearance is such that the workpieces can freely travel on the rollers 12, but sufficiently small to prevent one piece from riding up over another. If shingling occurs, the overlapping workpieces will bind between the rollers and the lower edges of the retainer rails and the conveyor will become inoperative.

As pointed out above, when the chuting is constructed to negotiate a curve or a helix, the row of rollers with the lesser radius of curvature, that is, the rollers 32 on the radially inner side of the curve, will have a greater helix angle than the outer row of rollers with the greater radius of curvature. When a large flat workpiece travels around such a curved portion of the chuting, the plate portion 42 is in contact with the rollers 32 essentially only at two diagonally opposite end portions of the plate, namely, at the trailing inner end portion and the leading outer portion. The intermediate portion of plate 42 is actually spaced slightly above and out of contact with the underlying rollers. The spacing between the intermediate portion of plate 42 and the underlying rollers will depend upon the radius of curvature and the helix angle of the chute. Thus, in the arrangement shown, if section 22 of the chute has a smaller radius of curvature than section 20, the resulting gap between the under surface of intermediate portion of plate 42 and the underlying rollers will be greater at section 22 that at section 20. It therefore follows that, in order to enable the workpieces to travel freely over the rollers at the straight as well as the curved sections of the chuting, the clearance between the lower edges of the retainer rails 34,36 and the upper surface of plate 42 must, of necessity, be greater at the curved sections of the chuting than at the straight sections, the largest clearance being required at the curved sections having the smaller radius of curvature.

I have found that the most expedient solution to this problem of establishing a clearance between the workpiece and the lower edges of the retainer rails at various sections of the chuting which is no greater than that necessary to permit the workpieces to travel freely over the rollers is to design the rails so that the vertical spacing between the rollers 32 and the lower edges of the retainer rails can be adjusted and varied as desired throughout the entire extent of the chuting. This can be accomplished in several ways.

For example, in FIGS. 1, 2 and 3, the openings 44 in side rail 12 for accommodating screws 38 are vertically elongated. This enables the retainer rail 36 to be adjusted vertically on side rail 12 to different positions along the various sections of side rail 12. For example, as shown in FIG. 2, if bolt 38 is shifted to the upper end of opening 44, rail 36 will be displaced upwardly through the distance designated X. Substantially the same result can be obtained by forming the vertically elongated slots in the retainer rails rather than in the side rails. In FIG. 1 the retainer rails 34,36 are formed with the horizontally elongated slots 46, whereas in FIG. 2 rail 34 is formed with a vertically elongated slot 48 so that the rail can be shifted vertically relative to the bolt 38. In this case side rail 10 can be formed with merely a series of round openings 50 for accommodating the shank of bolt 38.

FIGS. 6 and 7 show another form of chuting utilizing the present invention where the peripheral boundaries of the workpiece W1 are of irregular shape and cannot be used to guide the workpiece in the chuting. The workpiece W1 is also provided with a flange or plate portion 52 which is supported by and travels on rollers 54 mounted on support rails 56. Support rails 56 are formed with horizontally elongated slots similar to those designated 26 in FIG. 1 for accommodating the bolts 58 and are held in spaced apart relation by the spacers 60. The workpieces are retained laterally on rollers 54 by guide rails 62 and vertically by retainer rails 64. Vertically extending and longitudinally spaced support bars 66 have their lower ends secured by bolts 58 and nuts 68. Support bars 66 are maintained in a predetermined laterally spaced relation by small spacers 70 on bolts 58 on the laterally outer side of support rails 56. The upper ends of support bars 66 are secured together in spaced relation by bolts 72 and nuts 74. The rails 62,64 are supported on bolts 72 in spaced relation by spacers 76,78,80. Vertical adjustment of retainer rails 64 relative to the support rollers 54 is obtained by forming vertically extending slots 82 at their upper ends for accommodating the bolts 72. As an alternative, the lower ends of bars 66 can be formed with vertically extending slots as indicated at 84 for accommodating the bolts 58. In either case the clearance space between the lower edges of retainer rails 64 and the upper face of the workpiece can be varied as desired along the various sections of the chuting by either shifting the bolts 72 vertically on support bars 66 or shifting the support bars 66 vertically on bolts 58.

Regardless of whether the chuting is of the type illustrated in FIGS. 1 through 5 or FIG. 6, the retainer rails are initially loosely mounted on the chute assembly.

Thereafter, the workpiece to be conveyed is manually advanced through the various sections of the chuting and the retainer rails are shifted vertically so as to obtain the desired clearance at each section. Simultaneously, the successive retaining bolts are tightened to maintain the rails in their adjusted position.

I claim:

1. A gravity chuting system having a plurality of successively connected track sections including at least a downwardly inclined straight track section and a downwardly inclined curved track section, said sections each comprising a pair of upright laterally spaced thin spring tempered metal rails, a plurality of rollers mounted between said rails and forming a supporting and conveying surface for workpieces having flat plate-like portions adapted to rest on the rollers, the rollers at said curved section forming a helically extending work-supporting surface, means for retaining workpieces being conveyed on said track sections against vertical displacement so as to prevent shingling thereof, said retaining means comprising at least one upright, thin, spring tempered metal rail having a lower edge extending above said rollers in generally parallel relation therewith, a support member for supporting said retaining rail on said track sections, releasable fastening means extending through apertures in said retaining rail and said support member, said fastening means, when tightened, being adapted to secure the retaining rail on the track sections in a fixed position, at least some of said apertures being elongated vertically relative to the track sections to permit selective adjustment of the retaining rail vertically at each track section relative to the underlying support surface provided by said rollers before the fastening means are tightened, the vertical spacing between the lower edge of the retaining rail and the underlying support surface being greater at said curved section than at said straight section and being selectively adjusted at each section so as to permit the workpieces to travel freely through said sections on said rollers while simultaneously preventing shingling of the workpieces at both track sections.

2. A gravity chuting system as called for in claim 1 wherein the chuting includes a second downwardly inclined curved section having a radius of curvature different from the radius of curvature of the first curved section, the vertical spacing between the retaining rail and the underlying support surface being different at the first section than at the second section.

3. A gravity chuting system as called for in claim 2 wherein the vertical spacing between the lower edge of the retaining rail and the underlying support surface is smallest at the straight section and largest at the curved section having the larger radius of curvature.

4. A gravity chuting system as called for in claim 1 wherein said fastening means comprises bolts and nuts.

5. A gravity chuting system as called for in claim 4 wherein said vertically elongated openings are formed in said retaining rail.

6. A gravity chuting system as called for in claim 4 wherein said vertically elongated apertures are formed in said support member.

7. A gravity chuting system as called for in claim 1 wherein said track sections include a pair of laterally spaced rails located one at each side of the retaining rail for guiding the workpieces on said rollers.

8. A gravity chuting system as called for in claim 7 wherein said last-mentioned laterally spaced rails provide the support member for the retaining rail.

9. A gravity chuting system as called for in claim 7 wherein two laterally spaced retaining rails are provided and spaced between the two guide rails.

10. A gravity chuting system as called for in claim 6 wherein said support member comprises a plurality of pairs of vertically extending brackets spaced lengthwise of the track sections, said retaining rail being mounted at the upper ends of said brackets by means of said fastening means and said rollers being supported at the lower end portions of said brackets by said fastening means.

11. A gravity chuting system as called for in claim 10 wherein each of said fastening means comprises a nut and bolt assembly.

12. A gravity chuting system as called for in claim 11 wherein the elongated apertures are formed at one end portion of said brackets.

13. A gravity chuting system as called for in claim 1 wherein each track section includes a pair of said retaining rails which are spaced apart laterally, said elongated apertures enabling one retaining rail to be shifted vertically relative to the other retaining rail along said sections of the track.

* * * * *